United States Patent Office

3,817,719
Patented June 18, 1974

3,817,719
HIGH TEMPERATURE ABRADABLE MATERIAL AND METHOD OF PREPARING THE SAME
Peter W. Schilke, Meriden, and David V. Rigney, Portland, Conn., assignors to United Aircraft Corporation, East Hartford, Conn.
No Drawing. Continuation-in-part of abandoned application Ser. No. 161,946, July 9, 1971. This application Mar. 28, 1973, Ser. No. 345,619
Int. Cl. B22f 1/00, 15/00, 7/00
U.S. Cl. 29—182.5                    10 Claims

ABSTRACT OF THE DISCLOSURE

A homogeneous and porous abradable seal material structure comprising principally $\beta$ and $\gamma$ phases for use in elevated temperature operating apparatus consisting essentially of, by weight 48–68 percent Ni, 7–17 percent Cr, 1–20 percent Co, 10–26 percent Al, up to 3 percent elements selected from the group consisting of B, C, Si, P and W, up to 7 percent of a refractory metal selected from the group consisting of yttrium, hafnium and lanthanum and up to 7 percent dispersed powder material selected from the group consisting of mica, cobalt oxide, graphite, boron nitride, molybdenum disulfide, diatomaceous earth and vermiculite asbestos, the total amount of refractory metal and dispersed powder material not exceeding 10 percent, by weight.

---

This is a continuation-in-part of U.S. patent application Ser. No. 161,946 filed July 9, 1971 now abandoned.

BACKGROUND OF THE INVENTION

The present invention relates to abradable materials and more particularly relates to a low friction abradable material which is resistant to oxidation at elevated temperatures and is especially suitable for gas turbine engines.

It is known that the efficiency of a gas turbine engine is dependent in part upon the control of gas leakage between stages in both the compressor and turbine sections of the engine. Although the engine is typically designed and manufactured to very precise dimensional tolerances, it is necessary to provide a sufficient cold clearance between the tips of the rotating elements and the surrounding stator assembly to accommodate the differential thermal growth between the parts as the engine assumes its normal operating temperature. To this cold clearance must be added the usual manufacturing tolerances plus an additional safety factor to provide for limited engine operation at temperatures in excess of the design temperatures. The requisite clearances thus provided are, however, generally not sufficiently close to permit the engine to operate at its maximum theoretical efficiency.

In an effort to remedy this condition, it has been proposed to utilize an abradable surface on the assembly surrounding the rotating elements and to permit the knife-edge or squealer tips of the rotor system to penetrate into the coating as a result of thermal expansion, thereby permitting the rotor to seat itself against the casing assembly with what is essentially a zero clearance. A typical abradable seal construction of this type is shown in the patent to Emanuelson et al., 3,413,136, of common assignee with the present invention.

While in theory abradable type seals may be seen to have great potential in improving engine performance, current techniques and abradable seal structures have not been entirely satisfactory in their practical application to current high performance jet engines. In particular, the requirement for seal material which has a high thermal stability and melting point, a relatively constant degree of abradability and good thermal shock characteristics while possessing strong adherence to the metal substrate to which it is applied as well as good structural integrity in an elevated temperature environment up to 2200° F. has not been met.

SUMMARY OF THE INVENTION

The present invention relates to an abradable seal facing material for use in elevated temperature operating apparatus and more particularly relates to a homogeneous and porous nickel base abradable seal material structure comprising principally $\beta$ and $\gamma$ phases for use at temperatures of 2000° F. for sustained operation and up to 2200° F. for short term operation. The present invention also relates to a method for making such a material.

In brief, the present invention contemplates a homogeneous and porous abradable seal material structure comprising principally $\beta$ and $\gamma$ phases for use in elevated temperature operating apparatus consisting essentially of approximately, by weight, 48–68 percent Ni, 7–17 percent Cr, 1–20 percent Co, 10–26 percent Al, up to 3 percent elements selected from the group consisting of B, Si, P and W, up to 7 percent of a refractory metal selected from the group consisting of yttrium, hafnium and lanthanum and up to 7 percent dispersed powder material selected from the group consisting of mica, cobalt oxide, graphite, boron nitride, molybdenum disulfide, diatomaceous earth and vermiculite asbestos, the total amount of refractory metal and dispersed powder material not exceeding 10 percent, by weight. It is more preferable if the content of nickel, chromium, cobalt and aluminum is established to include approximately, by weight 52–65 percent Ni, 10–14 percent Cr, 3–15 percent Co and 13–22 percent Al. An optimum composition for such an abradable seal is approximately, by weight, 56 percent Ni, 11 percent Cr, 9 percent Co, 20 percent Al, 3 percent mica and 1 percent total of Y, Si and B.

Investigations have shown that the total porosity should be established at approximately 35–65 percent, more preferably at approximately 40–60 percent and most preferably at approximately 56 percent.

The present invention not only contemplates an abradable seal product but also the process for making the same and more particularly encompasses a method wherein alloy powders selected from the group consisting of NiCrCoAl, NiCr and CoAl, and CoCr and NiAl are sintered then oxidized to produce a homogeneous and porous abradable material consisting essentially of approximately, by weight, 48–68 percent Ni, 7–17 percent Cr, 1–20 percent Co and 10–26 percent Al. Various modifiers may be included with the aforesaid alloy powders in order to further increase the strength, oxidation resistance or porosity of the system. It is preferred, for example, to include small amounts of inert powders of silicate base material such as mica, diatomaceous earth or vermiculite asbestos, or nonsilicate type material such as cobalt oxide, graphite, boron nitride or molybdenum disulfide to provide increased lubricity as well as porosity. It is also preferred, for example, to include small amounts of refractory metal selected from the Group 3b or 4b elements, preferably from the group consisting of yttrium, hafnium and lanthanum in order to retard oxide spallation. In addition to the above two modifiers it has been found advantageous to include small amounts of nickel or cobalt braze alloys to increase system strength. Each of these modifiers may be added in an amount of up to 7 percent by weight, with the total thereof not to exceed 10 percent.

In the preferred method, the abradable coating is produced by blending a powder mixture of, by weight, 40–70 percent nickel-chromium alloy, 15–40 percent cobalt-aluminium-yttrium alloy, 5–15 percent nickel-aluminum alloy, 2–10 percent nickel brazing alloy and 2–5 percent inert material selected from the group consisting of mica, cobalt oxide, graphite, boron nitride, molybdenum disulfide, diatomaceous earth and vermiculite asbestos, heating the mixture in a non-oxidizing atmosphere to cause liquid phase sintering and heating the sintered mixture in an oxygen environment to promote the growth of oxides.

Seals made in accordance with the present invention have been found to possess characteristics heretofore unmatched by other abradables as outlined above. It is noteworthy, for example, that the seals of this invention have a low thermal conductivity and thus act as insulators to allow the maintenance of a steep thermal gradient between the hot gas path and the outer diameter of the seal while minimizing thermal losses.

DESCRIPTION OF THE PREFERRED EMBODIMENT

The seal material of the present invention is preferably used in conjunction with a holding member such as a conventional metal honeycomb of suitable material and configuration. A variety of metals may be used depending on the specific requirements of the engine. For example, stainless steels, such as A.I.S.I. type 321 and nickel or nickel-cobalt base alloys may be employed satisfactorily. Prior to usage, however, the holding member must be cleaned and degreased by means of an alkali cleaner or by the use of suitable solvents.

After cleaning, the holding member is coated with a braze alloy, such as NiCrSi (70.8 weight percent Ni, 19.0 weight percent Cr, 10.2 weight percent Si), along with a suitable binder, such as a cellulose nitrate solution, and is then allowed to dry. Next, alloy powders selected from the group consisting of NiCrCoAl, NiCr and CoAl, and CoCr and NiAl are, if necessary, thoroughly dry blended and mixed together, the total composition of the powders corresponding to, by weight, approximately 48–68 percent Ni, 7–17 percent Cr, 1–20 percent Co and 10–26 percent Al. The dry powders may then be mixed with a suitable binder such as a cellulose nitrate solution and packed, as by troweling, into the honeycomb. The carrier is allowed to evaporate and then sintered in a nonoxidizing atmosphere, such as argon or a vacuum, according to a schedule selected so as to limit the amount of liquid phase present at any given time to an amount below that which causes the material to slump and thus lose its porosity. As will be appreciated, a satisfactory sintering time-temperature cycle can be varied and depends on the particular composition of the material being treated and its intended application. Following sintering, the material is oxidized to stabilize the same by forming a protective oxide layer of $Al_2O_3$, $CoAl_2O_4$ and $NiAl_2O_4$ thereon. The sintered material may in general be heated in an oxygen containing atmosphere for a time sufficient to effect the formation of the above oxides. In air, for example, the sintered material is heated at 1800°F. for approximately 7–30 hours, preferably for about 20 hours.

The resulting product is a homogeneous abradable seal material comprising principally $\beta$ and $\gamma$ phases and having a total porosity of approximately 35–65 percent.

In order to further improve the properties of the above four element system, various modifiers are preferably added. In particular, in order to retard oxide spallation, a refractory metal powder is preferably added, prior to sintering, in an amount of up to 7 percent by weight. Refractory metals selected from the Group 3b and 4b elements such as yttrium, hafnium, and lanthanum are satisfactory. The refractory metals should be uniformly distributed in the seal material and are preferably present in an amount of 0.01 to 1.00 percent, by weight. The refractory metals have been found to increase the adherence of the $Al_2O_3$, $CoAl_2O_4$ and $NiAl_2O_4$ oxide layer to the seal particles.

To increase lubricity and adjust porosity, and therefor strength, it is preferred to add an inert powder material, up to 7 percent, by weight, prior to sintering. Satisfactory inert powders are those selected from the group consisting of mica, cobalt oxide, graphite, boron nitride, molybdenum disulfide, diatomaceous earth and vermiculite asbestos with the silicate-base materials, i.e. mica, diatomaceous earth and vermiculite asbestos being preferred. The inert materials may have a particle size generally within the range of 100 to 200 mesh and are preferably present in an amount of 2 to 5 percent by weight.

In addition to the aforesaid modifiers, a third modifier may be added prior to sintering, either alone or in conjunction therewith. It has been found advantageous to add up to 7 percent, by weight, nickel or cobalt braze alloys in order to increase the strength of the system. An example of a suitable nickel braze alloy is AMS 4778 and of a suitable cobalt braze alloy is that having the composition, by weight, 0.80 percent C, 21.0 percent Cr, 3.25 percent B, 10.0 percent W, 3.0 percent Si, 17.0 percent Ni, balance Co. While any nickel or cobalt base braze alloy is considered satisfactory, for the sake of particularity, the addition thereof of braze elements (defined herein as elements other than Ni, Co, Cr or Al normally found in nickel and cobalt braze alloys) selected from the group consisting of B, C, Si, P and W is to be limited to an amount in the composition of the abradable seal product which may be up to 3.0 percent, by weight, preferably up to 2 percent by weight. The increase of strength due to the addition of these braze alloys was indicated by an increase of hardness on a Rockwell superficial 45 kilogram load Y-scale (½ inch diameter ball indenter).

It will be understood that the sintering step is executed in order to form a bond between the particles themselves and between the particles and the holding member as well as to form oxidation resistant alloys. The aluminum-containing starting alloy powder, whether it be CoAl, NiAl or CoAlY, NiAlY, etc., acts as an active ingredient. While its inclusion in the pack, there results a liquid phase sintering wherein the sintering process is accelerated with resulting better diffusion and bonding than heretofore experienced.

The conditioning (oxidizing) cycle acts to promote the growth of oxides and thereby stabilize and toughen the seal material. During this step, the oxide layer of $Al_2O_3$, $CoAl_2O_4$ and $NiAl_2O_4$ is grown around all particles except those inert materials such as mica. The oxide mixture is quite lubricious and the porous structure, in contunction with the dispersed mica present, results in a sealing material characterized by a unique high temperature lubricity and stability.

The abradable seal filler material is in a sense a free standing sinter and is therefore quite porous, the porosity being in the range of approximately 35–65 percent. It is also in a broad sense a cermet since there is present both metal and oxide which contribute to the structural and physical characteristics of the system.

In order that those skilled in the art will better understand how the abradable seal of the present invention may be obtained, the following specific examples are provided. All percentages are by weight unless otherwise noted.

Example I

A powder mixture having the following composition was thoroughly dry blended and mixed together:

57.3% NiCr (80% Ni, 20% Cr) Metco 43F NS
28.5% CoAlY (30% Co, 69% Al, 1% Y) —325 mesh
6.7% NiAl (95.5% Ni, 4.5% Al) Metco 450
4.8% NiSi braze (AMS 4778) —325 mesh
2.7% mica —160 mesh The above mixture was mixed with a cellulose nitrate solution as a carrier and packed into a Nicraloy™ reinforcing foil. After carrier evaporation, the material was sintered in argon at 1800° F. for four hours, 1950° F.

for two hours and 2025° F. for one hour. Subsequently it was heated in air at 1800° F. for 20 hours. The resulting product was a porous homogeneous abradable structure having an open porosity of approximately 48 percent and a total porosity of approximately 56 percent with a mean pore size of about .001 inch. The structure consisted principally of β and γ phases and had a composition consisting essentially of 56.6 percent Ni, 11.5 percent Cr, 8.6 percent Co, 19.9 percent Al, 0.30 percent Y, 0.24 percent Si, 0.16 percent B and 2.7 percent mica.

The sintered and oxidized material of this example had a density of 3.1±0.2 grams per cm.$^3$ and exhibited a thermal conductivity which ranged from 1.35 B.t.u.-ft./ft.$^2$-hr.-° F. at 225° F. to 2.15 B.t.u.-ft./ft.$^2$-hr.-° F. at 1900° F. After 1000 hours at 2000° F. isothermal oxidation, as measured by scratch hardness, there was no change in hardness of the abradable material. Engine testing for over 2000 LCF cycles also showed no hardness change. It is important to note the significance of the fact that abradability does not change during operation. Most conventional abradable sealing materials increase in hardness because of oxide formation.

Rig and engine tests for hot gas erosion were extremely favorable. For example, with test conditions at .8 mach in jet fuel and air, the samples held at 2000° F. for 100 hours showed no erosion. No cracking, flaking or spalling of the material occurred.

Example II

The techniques of Example I were duplicated on a powder mixture having the following composition:

50% NiCr (80% Ni, 20% Cr) Metco 43F NS
35% CoAl (30% Co, 70% Al) −325 mesh
10% NiAl (95% Ni, 5% Al) Metco 450
5% mica −160 mesh After carrier evaporation, the material was sintered in argon at 1800° F. for five hours and 1950° F. for two hours. Subsequently it was heated in air at 1800° F. for 14 hours. The resulting product was a porous homogeneous abradable structure consisting principally of β and γ phases of a composition consisting essentially of 51.3 percent Ni, 10.3 percent Cr, 10.9 percent Co, 22.3 percent Al and 5.2 percent mica.

Example III

The techniques of Example II were duplicated on a powder mixture having the following composition:

58% NiCr (80% Ni, 20% Cr) Metco 43F NS
29% CoAl (30% Co, 70% Al) −325 mesh
10% NiAl (95% Ni, 5% Al) Metco 450
3% mica −160 mesh The material was sintered and oxidized as in Example II and the resulting product was a porous and homogeneous abradable structure consisting of princpally of β and γ phases of a composition consisting essentially of 55.8 percent Ni, 11.7 percent Cr, 8.7 percent Co, 20.9 percent Al and 2.9 percent mica.

Example IV

The techniques of Example I were duplicated on a powder mixture having the following composition:

66% NiCr (80% Ni, 20% Cr) Metco 43F NS
19% CoAl (30% Co, 70% Al) −325 mesh
9% NiAl (95% Ni, 5% Al) Metco 450
3% mica −160 mesh
3% NiSi braze (AMS 4778) −325 mesh After carrier evaporation, the material was sintered in argon at 1800° F. for three hours and 1950° F. for two hours. It was then heated in air at 1800° F. for 14 hours. The resulting product was a porous homogeneous abradable structure consisting principally of β and γ phases of a composition consisting essentially of 63.2 percent Ni, 13.4 percent Cr, 5.9 percent Co, 14.3 percent Al, 0.1 percent Si, 0.1 percent B and 3.0 percent mica.

Example V

The techniques of Example I were again duplicated on a powder mixture having the following composition:

68% NiCr (80% Ni, 20% Cr) Metco 43F NS
14% CoAl (30% Co, 70% Al) −325 mesh
10% NiAl (95% Ni, 5% Al) Metco 450
3% mica −160 mesh
5% NiSi braze (AMS 4778) −325 mesh This material was sintered in argon at 1800° F. for two hours and 1950° F. for three hours and oxidized in air at 1800° F. for 20 hours. This product was similar to those above and consisted essentially of 63.2 percent Ni, 14.2 percent Cr, 4.6 percent Co, 11.2 percent Al, 0.1 percent Y, 0.2 percent Si, 0.2 percent B and 3.0 percent mica.

The last example is Example VI. The same techniques as Example I were utilized on the following powder mixture:

53% NiCr (80% Ni, 20% Cr) Metco 43F NS
28% CoAlY (30% Co, 69% Al, 1% Y) −325 mesh
6% NiAl (95% Ni, 5% Al) Metco 450
3% mica −160 mesh
10% NiSi braze (AMS 4778) −325 mesh This material was sintered and oxidized under conditions identical to those as Example V above. The resulting product was similar in structure to those described heretofore and had a composition consisting essentially of 53.0 percent Ni, 11.6 percent Cr, 9.2 percent Co, 22.0 percent Al, 0.1 percent Y, 0.5 percent Si, 0.3 percent B and 3.3 percent mica.

Experiments were performed varying the mica content from 0.0 percent mica to 15.5 percent mica. The resultant hardness of the samples varied in proportion to the amount of mica used, i.e. the higher the mica content, the lower the resultant hardness. An amount ranging from 2 to 5 percent is preferred with an optimum amount of 2.7±.2 percent being based on dynamic blade tip interactions and erosion testing to match blade configurations and gas velocities in the turbine environment. While the experiments were conducted using mica, it is contemplated that other dispersed materials, such as cobalt oxide, graphite, boron nitride, molybdenum disulfide or vermiculite asbestos or the like could be used. As is known, several of these materials have the property of elevated temperature lubricity which will aid in the prevention of galling.

Experiments were also performed varying the amount of AMS 4778 braze alloy (−325 mesh) from 0.0 to 20.0 percent. Results showed that an increase in hardness is obtained by increasing the amount of braze alloy and a decrease in hardness by decreasing the amount. The percentage of the other ingredients was also varied and oxidation testing conducted showed that the disclosed ratios provide optimum oxidation resistance with proper sintering characteristics.

While the present invention has been described with reference to certain specific examples thereof, no limitation is intended thereby except as defined in the appended claims:

What is claimed is:

1. A homogeneous and porous abradable seal structure consisting principally of β and γ phases for use in elevated temperature operating apparatus consisting essentially of approximately, by weight, 48–68 percent Ni, 7–17 percent Cr, 1–20 percent Co, 10–26 percent Al, up to 3 percent elements selected from the group consisting of B, C, Si, P and W, up to 7 percent of a refractory metal selected from the group consisting of yttrium, hafnium and lanthanum and up to 7 percent dispersed powder material selected from the group consisting of mica, cobalt oxide, graphite, boron nitride, molybdenum disulfide and vermiculite asbestos, the total amount of refractory metal and dispersed powder material not exceeding 10 percent, by weight.

2. The invention of claim 1 wherein said structure has a total porosity of approximately 35–65 percent.

3. A homogeneous and porous abradable seal structure consisting principally of $\beta$ and $\gamma$ phases for use in elevated temperature operating apparatus consisting essentially of approximately, by weight, 52–64 percent Ni, 10–14 percent Cr, 3–15 percent Co, 13–22 percent Al, up to 2 percent elements selected from the group consisting of B, C, Si, P and W, 0.01–1.00 percent of a refractory metal selected from the group consisting of yttrium, hafnium and lanthanum and 2–5 percent dispersed powder material selected from the group consisting of mica, cobalt oxide, graphite, boron nitride, molybdenum disulfide and vermiculite asbestos, the total amount of refractory metal and dispersed powder material not exceeding 10 percent, by weight.

4. The invention of claim 3 wherein said structure has a total porosity of approximately 35–65 percent.

5. A homogeneous and porous abradable seal material structure consisting principally of $\beta$ and $\gamma$ phases for use in elevated temperature apparatus consisting essentially of, approximately, by weight, 56 percent Ni, 11 percent Cr, 9 percent Co, 20 percent Al, 3 percent mica and 1 percent total of Y, Si and B.

6. The invention of claim 5 wherein said structure has a total porosity of approximately 35–65 percent.

7. A method of producing an abradable coating for use in jet engine components exposed to temperatures up to 2000° F. comprising:

blending a powder mixture of, by weight, (a) 40–70 percent nickel-chromium alloy consisting essentially of approximately, by weight, 80 percent Ni, 20 percent Cr, (b) 15–40 percent cobalt-aluminum-yttrium alloy consisting essentially of approximately, by weight, 30 percent Co, 69 percent Al, 1 percent Y, (c) 5–15 percent nickel-aluminum alloy consisting essentially of approximately, by weight, 95 percent Ni, 5 percent Al, (d) 2–10 percent nickel brazing alloy and (e) 2–5 percent dispersed material selected from the group consisting of mica, cobalt oxide, graphite, boron nitride, molybdenum disulfide, diatomaceous earth and vermiculite asbestos;

heating said mixture in a nonoxidizing atmosphere according to a schedule which causes liquid phase sintering without causing slump; and heating said sintered mixture in an oxygen containing environment to promote the growth of oxides.

8. The method of claim 7 wherein said mixture is sintered in argon at approximately: 1800° F. for four hours, 1950° F. for two hours and 2025° F. for one hour.

9. The method of claim 8 wherein said sintered mixture is heated in air at approximately 1800° F. for approximately 20 hours.

10. The method of claim 9 wherein said dispersed material is mica.

References Cited
UNITED STATES PATENTS

| | | | |
|---|---|---|---|
| 3,649,225 | 3/1972 | Simmons | 29—198 |
| 3,413,136 | 11/1968 | Emanuelson et al. | 117—8 |
| 3,552,953 | 1/1971 | Lemkey et al. | 75—171 |

BENJAMIN R. PADGETT, Primary Examiner

B. HUNT, Assistant Examiner

U.S. Cl. X.R.

29—182; 75—200, 206, 224, 171; 148—126